April 23, 1968     K. W. COWANS     3,379,026
HEAT POWERED ENGINE
Filed May 18, 1967     3 Sheets-Sheet 1
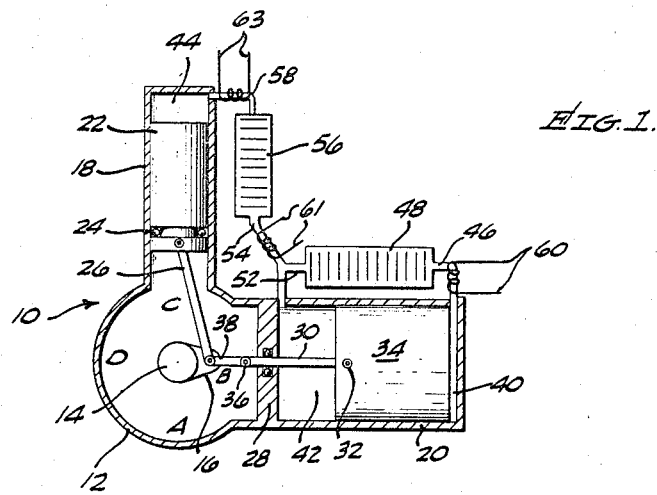
INVENTOR.
KENNETH W. COWANS,
BY
ATTORNEY.

INVENTOR.
KENNETH W. COWANS,
BY
ATTORNEY.

INVENTOR
KENNETH W. COWANS,
BY
ATTORNEY.

United States Patent Office 3,379,026
Patented Apr. 23, 1968

3,379,026
HEAT POWERED ENGINE
Kenneth W. Cowans, Los Angeles, Calif., assignor to Hughes Aircraft Company, Culver City, Calif., a corporation of Delaware
Continuation-in-part of application Ser. No. 531,183, Mar. 2, 1966. This application May 18, 1967, Ser. No. 658,304
20 Claims. (Cl. 62—6)

ABSTRACT OF THE DISCLOSURE

Several embodiments of cryogenic engines are disclosed which utilize input heat as an energy source resulting in efficient low-temperature refrigeration and useful work output. Cylinders arranged in out-of-phase relationship have pistons connected to a common crankshaft. The pistons have surfaces in facing communication with the crankcase volume for conventional rod connection to the shaft. The surfaces on said pistons may be sized in relation to the stroke of the respective pistons so that the swept volume of the respective surfaces are substantially equal during each machine cycle. The result is an efficient machine configuration offering exceptionally smooth operation in service. Additionally, by predetermining the pressure level of the gas in the crankcase, torque or work output at the crankshaft may be uninterrupted and thereby further improve the smoothness of engine operation.

---

This application is a continuation-in-part of my application Ser. No. 531,183, filed Mar. 2, 1966, now abandoned, and entitled "Heat Powered Engine."

The invention relates to cryogenic engines adapted to use input heat as a power source to induce engine operation and obtain therefrom a useful work output and additionally provide a mode of efficient low-temperature refrigeration in the cryogenic range.

Current technology, e.g., certain infrared detector operation, requires that the detector be held at a temperature level in the cryogenic range. Many such uses are under field conditions where conventional power supplies are not available and it is desirable that the available equipment offer ease of operation and be efficiently utilized to accomplish as many tasks as possible.

It is a well-known thermodynamic principle that gas expansion may be utilized as a source of cooling for low-temperature refrigeration. Typically, a gas may be disposed in a cylinder at a relatively high pressure and temperature. A piston may be used to seal the cylinder and compress the gas and if that piston is allowed to move to increase the cylinder volume, the gas expands, decreases in pressure, and the movement of the piston used as mechanical work output. The work output obtained results from the dissipation of the thermal energy of the gas, the latter becoming colder as a result of the loss of that thermal energy. As is well known, this process is reversible, namely, mechanical energy can cause the piston to be moved to decrease cylinder volume which increases gas pressure and temperature, the heat being obtained by the translation of mechanical work.

Within a constant volume cylinder, the pressure and temperature of the gas may be raised by heat application and temperature and pressure of the gas may be decreased by heat removal or cooling.

In the disclosed cryogenic engine, the principles outlined above are utilized to concurrently produce useful work and refrigeration. For example, the refrigerating effect produced could be used to cool a detector and the mechanical work available could be used to power an electrical generator or alternator.

A gas such as helium, which exists in liquid form in the cryogenic temperature range, is compressed by adding heat to bring it to a relatively high temperature and pressure. Typically, the gas is cooled, transferred to an expansion chamber, expanded at a relatively low temperature producing both useful work and a refrigerating effect at a desired cryogenic temperature. The compression and expansion stages described require that the gas move in a closed circuit within the engine from a relatively high temperature portion to a low temperature portion without introducing excessive heat at the low temperature portion. Thermal regenerators are used for this purpose. The regenerator absorbs heat as the hot gas moves through it and the gas is discharged therefrom at a relatively low temperature. Upon reverse flow of the cooled gas through the regenerator it is heated and discharged at substantially its original temperature.

Accordingly, it is a primary object of the invention to provide a cryogenic engine designed to provide both a mechanical work output and low temperature refrigeration in the cryogenic range.

It is a further object of the invention to provide the described engine adapted to use input heat as an operating power source.

It is a further object of the invention to provide an engine of the type described which is easily operated and extremely useful in field service applications.

It is yet a further object of the invention to provide an engine of the type described having structure to improve the smoothness of engine operation.

It is yet another object of the invention to provide an engine of the type described utilizing appropriate pressure levels in the crankcase volume to provide a substantially continuous torque output at the machine crankshaft during engine cycling.

These and other objects and purposes of the invention will be further understood by reference to the following specification and the related drawings, wherein:

FIGURE 1 is a partially schematic, vertical, sectional view of a first embodiment of the invention;

FIG. 2 is a typical pressure-volume diagram illustrating the action of the gas used in the engine during engine operation;

FIG. 6 is a partially schematic, vertical, cross-sectional view of yet another embodiment of the invention;

Figure 3:
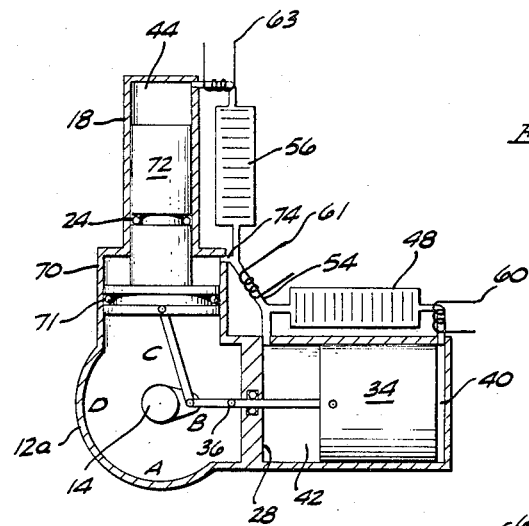
FIG. 3 is a partially schematic, vertical, cross-sectional view of an alternate embodiment of the invention which provides increased work output.

As described above, it is necessary to move the refrigerating gas from the high temperature section of the engine to the low temperature section, and back again, without introducing excessive heat into the low-temperature section. Thermal regenerators have been developed to accomplish such transfer. As is well known in the art, a typical thermal regenerator may comprise a tube or other gas passage internally packed with a finely divided mass of thermally sensitive material, arranged so that the gas will flow therethrough. Steel wool is a good example of packing material. Ports accommodating gas passage are at opposed ends of the regenerator. As hot gas is introduced at one end of the regenerator and moves therethrough, the gas gives up most of its heat to the mass and passes from the opposed end of the regenerator in a cold condition. The mass of the regenerator thus varies in temperature continuously along its length. If the process is reversed and the now cooled gas is moved through the regenerator mass from the cold end to the hot end, the regenerator mass gives up its heat to the moving gas and the gas emerges at the hot end at substantially its original temperature.

Directing attention to FIG. 1, it will be seen that an engine, indicated generally at 10, comprises a work output section or crankcase housing 12 having therein a rotatable crankshaft 14. An eccentric arm or crank 16 moves with the shaft 14. A cooling or expansion cylinder 18 and a displacer cylinder 20 are integrally formed with the housing 12 and in a 90° phase relationship with each other. An expander piston 22 is movably disposed in cylinder 18 for vertical reciprocation therein and may be provided with a conventional seal 24 to isolate the housing 12. A connecting rod 26 is pivoted, at opposed ends, to the skirt of piston 22 and eccentric arm 16, respectively.

A wall 28 separates housing 12 from displacer cylinder 20 and has a central aperture therethrough receiving a connecting rod 30, the latter having one end connected as at 32 to a displacer piston 34. The opposed end of connecting rod 30 is pivotally connected as at 36 to link 38, the latter being pivotally attached to eccentric arm 16.

The displacer piston 34, of course, is reciprocally movable within displacer cylinder 20 and defines therein a high temperature chamber 40 and a cooler or rejection temperature chamber 42. Piston 22, on the other hand, defines with cylinder 18 an expansion chamber 44.

A conduit 46 communicates with chamber 40 and one end of a first regenerator 48. A second conduit 50 communicates with the other end of regenerator 48 and is further joined to conduits 52 and 54. The conduit 52 is in communication with chamber 42 while the conduit 54 communicates with one end of a second regenerator 56, the latter having its opposed end connected to conduit 58 which in turn is in communication with expansion chamber 44.

A heat input source is schematically illustrated by the coil 60 and is in thermal heat expansion relation with the gas in chamber 40 of the displacer cylinder 20. While the heat source is indicated diagrammatically at the electrical coil 60, it will be understood that any source may be utilized such as, for example, an open flame from ignited gasoline under field conditions or focused sunlight if the device is used in an outer space environment. Additionally, a cooling coil 61 surrounds conduit 54 to accommodate heat dissipation to ambient and a heat load represented by coil 63 is in thermal transfer relation with cylinder 18. In a frequent use the heat load 63 may be an infrared detector.

To understand the operation of the embodiment of FIG. 1, heat is initially supplied to chamber 40 raising the temperature and pressure of the gas therein. Assuming crankshaft 14 and eccentric 16 are in indicated position A, the piston 22 will be at bottom dead center while the displacer piston 34 will be centrally disposed within cylinder 20. As the arm 16 is moved to position B, piston 22 is moved upwardly in cylinder 18 to a central position and chamber 44 decreases in volume. Concurrently, the displacer 34 is moved to top-dead-center within cylinder 20 and it would normally be expected that the decrease in volume would tend to raise the pressure of the gas within the system. However, movement of the displacer 34 forces the relatively hot gas from chamber 40 through regenerator 48 and into chamber 42 at the opposite end of cylinder 20. In passing through the regenerator 48, the relatively hot gas is cooled by disgorging its heat to the regenerator mass which tends to lower the pressure in the system and thus, as the eccentric moves from position A to position B, an approximate pressure change balance is attained so the movement noted occurs at a substantially constant pressure. The total volume, however, of the closed system is reduced.

As the eccentric 16 moves from B to C, piston 22 is moved to top-dead-center within cylinder 18 and at the same time the displacer piston is moved to a central position within cylinder 20. Movement of the displacer piston forces gas from chamber 42 through the regenerator 48 to chamber 40, and, concurrently, movement of piston 22 forces the gas from chamber 44 through regenerators 56 and 48 to chamber 40. Movement of the gas through the regenerators 56 and 48 raises the temperature thereof which further increases the pressure. Both the action of the piston 22 and the displacer 34 as well as the absorption of heat in the regenerators raise gas pressure to its peak or the maximum working pressure.

The pressure of the compressed gas within the system forces piston 22 downwardly moving the eccentric 16 from position C to position D, piston 22 moving to a central position within cylinder 18. Displacer 34 moves to bottom-dead-center within cylinder 20 forcing gas out of chamber 42 through regenerator 48 into chamber 40. A portion of the gas may also pass through regenerator 56 and into expansion chamber 44. The gas flowing to chamber 44 rejects a certain amount of heat to ambient via cooling coil 61. It is further cooled in regenerator 56 before entering expansion chamber 44. This action substantially increases the volume within the closed circuit with resulting pressure decrease.

During the last phase of engine operation, continued gas expansion moves the eccentric 16 from point D to point A further increasing the volume of chamber 44. Piston 22 moves to bottom-dead-center. Displacer 34 moves to a central position causing some gas flow from chamber 40 to chamber 42 through cooling regenerator 48. The expansion of the gas in chamber 44 produces positive work output at crankshaft 14 and also cools to provide a refrigerating effect at cylinder 18.

Attention is directed to FIG. 2, a typical pressure volume curve for the engine just described. Note the points A, B, C and D correspond to the crankshaft positions identically labeled and described with reference to FIG. 1. At point A the gas within the system is at virtually minimum pressure and maximum volume. As the crankshaft is rotated from point A to point B, volume is substantially reduced at a relatively constant pressure. From point B to point C the pressure increases to maximum working pressure and the volume of the closed system is reduced to minimum value. Movement from point C to D results in an important increase in volume at a relatively constant pressure, while movement from D to A receives a maximum increase in volume and a decrease in pressure to approximate minimum working value. Positive work, of course, is produced by downward movement of piston 22. The effective work produced at the crankshaft is defined by the area within the curve of FIG. 2. Some of this work, of course, is used to overcome friction in the engine and cycle the gas refrigerant as described. The balance of the created work may be tapped in any conventional manner and used to accomplish work outside of the machine such as driving a fan to cool the engine or powering a generator to provide an independent electrical power source or both.

Overall engine efficiency is the ratio of energy input to energy output. In the disclosed engine, energy input of course, is the heat transferred to the gas at chamber 40. Energy output is the sum of mechanical output at crankshaft 40 and the refrigeration produced at cylinder 18. The relationship between mechanical output and refrigeration may be varied by altering certain physical features of the engine.

For example, and directing attention to FIG. 3, a modified embodiment of the engine is illustrated designed to provide a greater work output in proportion to refrigerating effect. Many structural aspects of the embodiment of FIG. 3 are identical with the embodiment of FIG. 1 and, where identity exists, identical numerals are used.

The housing 12a may be somewhat modified to provide an enlarged secondary expansion chamber 70 below cylinder 18. An annular seal 71 is provided therefor. A conduit 74 establishes communication with conduit 54 at one end thereof and with the enlarged volume 70 at the other end thereof. Thus, gases at rejection temperature from chamber 42 pass directly to the chamber 70 without passing through any regenerator. The expansion of this gas in chamber 70 is therefore utilized to increase the work output at crankshaft 14, in effect, supplementing the expansion occurring at chamber 44. In this embodiment, the cooling of the gas in chamber 70 is not usually used in any manner to create refrigeration that would be purposefully used.

Figure 4:
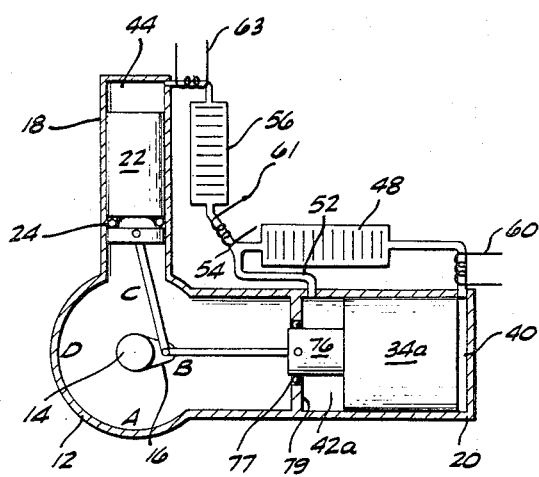
FIG. 4 is a partially schematic, vertical, cross-sectional view of yet another embodiment of the invention.

In the embodiment of FIG. 4, the effective piston area of displacer 34a is reduced in the chamber 42a by virtue of annula boss 76. The boss 76 is telescopically received within opening 77 in wall 79. As a result of the differential in surface area on opposed faces of piston 34a a substantially greater total force exists in chamber 40 than in chamber 42a. Therefore, pressure created in chamber 40 by the application of heat to the gas therein substantially overpowers the force in chamber 42a and induces movement of displacer 34a from top-dead-center (B) to a central position (C) and then to bottom-dead-center (D). The displacer, therefore, in this embodiment, not only serves to transfer gas between chambers 40 and 42a, but additionally acts as a power piston to impart torque to shaft 14. The torque thus applied supplements that applied by piston 22. The net effect is increased mechanical work output and smoother engine operation. Again, this result is achieved because boss 76 which reduces the surface area of the displacer in chamber 42a reduces the total force available as a result of pressure of gas therein.

Figure 5:
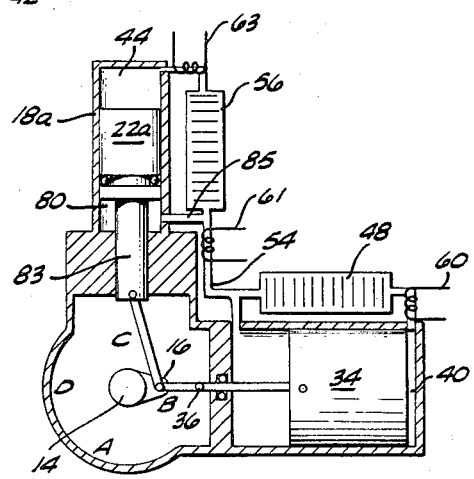
FIG. 5 is a partially schematic, vertical, cross-sectional view of yet another embodiment of the invention.

Directing attention to FIG. 5, it will be seen that a modified expansion cylinder 18a is provided having disposed therein an altered expansion piston 22a. The expansion piston 22a, at its lower aspect, is provided with a necked-down portion 83 which defines an expulsion chamber 80 below the enlarged segment 22a. The chamber 80 communicates with line 54 via line 85. During the expansion stroke, namely, from position C to position A, as the piston 22a moves from top-dead-center to bottom-dead-center, it will be apparent that the volume of gas within chamber 80 will be discharged through line 85 and a portion of the latter will be directed through regenerator 56 to chamber 44 while another portion will be moved through line 54, regenerator 48 to chamber 40. In this configuration, therefore, the mechanical work output of the engine may be reduced as it will be apparent that the total volume of gas actually moved on the expansion stroke does not equal the maximum volume available at chamber 44 when piston 22a is at bottom-dead-center. The volume of chamber 44 at piston bottom-dead-center is diminished by a portion of the gas discharged by virtue of closure of lower chamber 80.

Considering, briefly, FIG. 6, it will be apparent that the configuration of the expanion chamber 18a of FIG. 5 has been adopted in conjunction with the configuration of the displacer cylinder 20 of the embodiment of FIG. 4. The utilization of the low work output of configured piston 22a is somewhat offset by employing the configured piston 34a because, as explained above, piston 34a adds an output torque to the crankshaft 14, hence, the mechanical work output of this embodiment is increased over the embodiment of FIG. 5. A specific result, however, of this configuration is overall smoother engine operation.

For an understanding of another feature of the disclosed invention attention is directed to FIGS. 4 and 6. In FIG. 4 it will be particularly noted that the boss 76 of displacer 34a is provided with a surface 73 disposed within and facing the volume 12a of crankcase housing 12. Additionally, the piston 22 is provided with a surface 23 which communicates directly with the volume 12a of crankcase housing 12.

In many applications, indeed most, it is desirable that the engine operate as smoothly as possible. To achieve a high degree of smooth operation, the surfaces 73 and 23 of the displacer 34 and piston 22 respectively are sized, that is, the areas are predetermined in relation to the stroke of the respective displacer and piston, so that the swept volumes of the surfaces 73 and 23 are substantially equal. For example, this result may be achieved, assuming the stroke of displacer 34a and the stroke of piston 22 are identical, by making the surfaces 23 and 73 of equal area.

In the embodiment of FIG. 6, it is noted that the boss of displacer 34a is likewise provided with a surface 73 disposed within the crankcase volume 12a of the crankcase 12. Additionally, the extension 83 of piston 22a protrudes through a defining wall in the housing and is provided with a surface 23a, again disposed in crankcase volume 12a. As described above, smooth operation of this configuration may be achieved by a design feature which dictates that the swept volumes of the surface 23a and 73 are substantially equal. Again, if the respective strokes of displacer 34a and piston 22a are equal, this may be achieved by equaling the surface areas 22a and 73.

Figure 7:
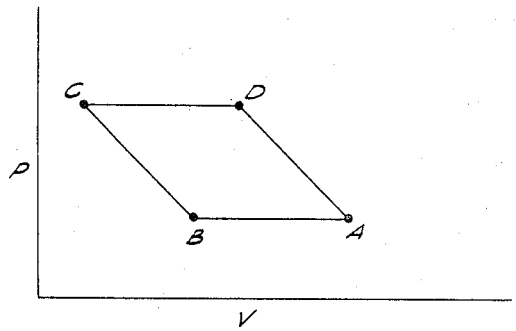
FIG. 7 is a pressure volume diagram of typical gas action at the cold cylinder.
Figure 8:
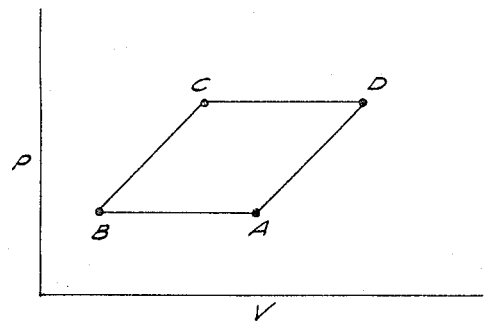
FIG. 8 is a pressure volume diagram similar to FIG. 7 but showing gas action at the hot cylinder.
Figure 9:
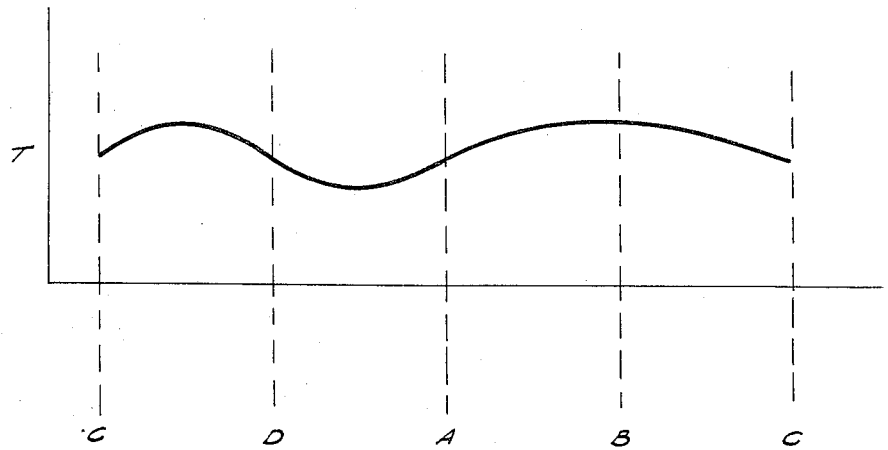
FIG. 9 is a torque output diagram related to degree of crankshaft rotation for one mode of the disclosed engine.

Attention is directed to FIGS. 7, 8 and 9 which illustrate pressure volume diagrams and torque output at crankshaft 14 for refrigerator configurations such as those above described. It will be noted that points A, B, C, and D identify, in FIG. 7, gas action at the cold cylinder 18 and the identical points in FIG. 8 indicate gas action at hot cylinder 20 of the engines disclosed. Similarly, the points A, B, C and D in FIG. 9 illustrate the torque output at the crankshaft 14 when one mode of engine structure and operation is employed.

When it is desired to provide a continuous torque output at the shaft 14 as shown in FIG. 9, a gas pressure level in the crankcase volume 12a is provided which is intermediate the high and low pressures developed during the refrigerating cycle. In view of the fact that the engines disclosed are sealed, closed-cycle engines, it will be understood that any pressure level may be provided in volume 12a when the engine is fabricated.

Referring to FIG. 6 and assuming that the crank 14 is in the C position, it is noted that a maximum pressure then exists in cylinder 18a and a maximum pressure exists in cylinder 20. Movement of the crank from position C to D results in a high torque output at the crank 14 as is shown by the C–D portion of the graph of FIG. 9. During movement of the crank from position D to A displacer 34 has reached bottom-dead-center and is moving toward its central position while piston 22a is moving to its bottom-dead-center. As indicated in the graph of FIG. 9, torque output at shaft 14 continues at a high level as a result of thrust received via piston 22a though it is diminished somewhat because no thrust is received via the displacer 34a. It would normally be expected that movement of the crank from position A to B would be accompanied by no work output or positive torque at crank 14. Referring to FIGS. 7 and 8, it will be apparent that at position A the pressure in the cycling refrigerating gas is at a minimum. However, the provision of a positive pressure in the crankcase volume 12a, which is above the minimum pressure achieved by the system at any time in its cycle, will result in a positive driving force being applied to surfaces 23a and 73 and, therefore, a positive torque or work output at crank 14. During movement of the crank from position B to position C, displacer 34a is moving toward central position and this motion contributes to a positive torque output at crankshaft 14. While this torque is somewhat reduced as shown in segment B–C of FIG. 9, nevertheless, positive torque output is obtained.

In some instances design considerations may dictate that the pressure in crankcase volume 12a be located at or below the minimum pressure developed during refrigerating gas cycling. In this mode of operation continuous torque output at crank 14 is not achievable and hence the ultimate in smooth engine operation not available. However, by providing a gas pressure in the volume 12a at the minimum working pressure in the engine negative work effect is avoided and all that occurs is that during certain segments of the cycle, for example, from positions A to B, there is no positive work output at the crank 14. In this mode of operation the engine will operate smoothly but not as smoothly as in the mode above described.

In field operation of any of the embodiments shown, the heat source 60 is initially energized to heat the gas in chamber 40. After heating, it may be required that the operator manually rotate the crankshaft a few revolutions to initiate the above-described cycles. Thereafter the engine is self-operating.

It will thus be apparent that the engine disclosed may be powered by any available heat supply and operated to concurrently provide a refrigerating effect in the cryogenic temperature range and concurrently provide a mechanical work output available for other use such as the operation of an electrical generator or the like. The engine is particularly useful in providing both refrigeration and power in the operation of integrated infrared detector assemblies under field conditions. Its simplicity in construction and easy maintenance features provide further utility in this application.

The invention as shown is by way of illustration and not limitation and may be modified all within the scope of the appended claims.

What is claimed is:

1. In a cryogenic engine adapted to concurrently deliver mechanical work output and a refrigeration output,
   the combination of a housing having a movable member therein,
   a first segment defining a volume having a movable displacer element therein and dividing said volume into a hot chamber and a heat rejection chamber,
   a passage establishing communication between the chambers and including first regenerator means therein,
   a second segment defining a second volume having a movable piston element disposed therein and defining within the second volume an expansion chamber,
   first and second link means interconnecting the displacer element and the movable member and the piston element and the movable member, respectively,
   a second passage establishing communication between the first passage and the expansion chamber,
   said second passage including second regenerator means therein,
   all of said regenerator means being operable to remove heat from gas passing therethrough having a temperature level greater than the temperature level of the regenerator means and to add heat to gas passing therethrough having a temperature level less than the temperature level of the regenerator means,
   means associated with the rejection chamber to dissipate heat from the engine,
   said chamber and said passages being a closed system having a gas therein,
   at least certain of said elements having surfaces of unequal area to thereby enhance the mechanical output of the engine,
   means to transfer heat to the hot chamber and raise the temperature of the gas therein and initiate the cycling of the piston and displacer elements to first concurrently induce gas flow from the expansion chamber and the hot chamber to the rejection chamber, and, secondly induce gas flow from the expansion chamber and the rejection chamber to the hot chamber, and, thirdly to induce gas flow from the rejection chamber to the hot chamber and expansion chamber, and, lastly to induce gas flow from said hot chamber to the rejection chamber and expansion chamber,
   whereby said gas expands in the expansion chamber concurrently cooling said expansion cylinder and delivering work to said movable member by inducing movement of the piston element and the interconnecting first link means.

2. A cryogenic engine adapted to concurrently deliver mechanical work output and refrigeration output according to claim 1,
   and including a heat load thermally associated with the second cylinder to be cooler thereby.

3. A cryogenic engine adapted to concurrently deliver mechanical work output and refrigeration output according to claim 2,
   and including a second expansion chamber having a second piston element therein,
   and a third passage establishing communication between the rejection chamber with the second expansion chamber.

4. A cryogenic engine adapted to concurrently deliver mechanical work output and refrigerator output according to claim 2,
   wherein said displacer element has a first pressure surface in the hot chamber and a second pressure surface in the rejection chamber,
   said pressure surfaces being of unequal area.

5. A cryogenic engine adapted to concurrently deliver mechanical work output and refrigerator output according to claim 4,
   wherein the pressure surface in the rejection chamber has an area less than the area of the pressure surface in the hot chamber.

6. A cryogenic engine adapted to concurrently deliver mechanical work output and refrigerator output according to claim 2,
   wherein the movable element is a rotatable crankshaft disposed within a work chamber in said housing.

7. A cryogenic engine adapted to concurrently deliver mechanical work output and refrigerator output according to claim 6,
   wherein said second volume is in communication with said work chamber and said hot and rejection chambers are sealed from the work chamber.

8. A cryogenic engine adapted to concurrently deliver mechanical work output and refrigerator output according to claim 7,
   wherein said volumes in said segments are cylinders having axes in 90° angular relation to each other.

9. In an engine adapted to deliver refrigeration at cryogenic temperature levels and work output using a supply of heat as a sole source of input energy, the combination of a crankcase housing having a rotatable crankshaft therein,
   a displacer housing adjacent the crankshaft housing and having a movable displacer piston therein defining a hot chamber and a heat rejection chamber,
   an expansion housing adjacent the crankcase housing and having a movable expansion piston therein defining an expansion chamber and an expulsion chamber, link means interconnecting the respective pistons to the crankshaft, passage means interconnecting the hot chamber and heat rejection chamber, said passage means including a first regenerator device, other passage means interconnecting said expulsion chamber and expansion chamber, said other passage means including a second regenerator device, conduit means interconnecting the passage means intermediate the regenerator devices, said conduit means including heat exchange means to dissipate heat to ambient, said chambers, passage means and conduit means comprising a closed system having a gas therein capable of liquefaction at cryogenic temperatures, heating means in operative association with the hot chamber and adapted to increase the temperature of the gas within the hot chamber to induce concurrent reciprocation of the pistons and transfer the gas from the hot chamber through the first regenerator device to the heat rejection chamber and the expansion chamber, and to then induce gas flow from the expansion chamber and the hot chamber to the heat rejection chamber and expulsion chamber, and then to induce gas flow from the expansion chamber and heat rejection chamber to the hot chamber and expulsion chamber, and to then induce gas flow from the heat rejection chamber and expulsion chamber to the hot chamber and expansion chamber to thereby accommodate expansion of the gas within the expansion chamber and lower the temperature thereof to produce a refrigerating effect.

10. An engine adapted to deliver refrigeration according to claim 9, wherein opposed surfaces of said expansion piston are of unequal area.

11. An engine adapted to deliver refrigeration according to claim 10, wherein opposed surfaces of said displacer piston are of unequal area.

12. An engine adapted to deliver refrigeration according to claim 11,
wherein the surface of said expansion piston having the smaller area is disposed within said expulsion chamber,
and the surface of said displacer piston having the smaller area is disposed in said heat rejection chamber.

13. In a cycling gas cryogenic engine adapted to concurrently deliver mechanical work output and refrigeration output comprising a housing,
said housing having a first cylinder including a reciprocating displacer therein dividing the cylinder into a hot chamber and a cool chamber,
said housing having a second cylinder including a reciprocating piston therein and defining with the cylinder a cold chamber,
said housing having a crankcase defining a crankcase volume with a crankshaft rotatable therein,
said displacer and piston having surfaces thereon in direct communication with the crankcase volume,
rod means connecting the crankshaft and the respective displacer and piston to reciprocate same in out-of-phase relation concurrently with the rotation of the crankshaft,
passage means interconnecting the cold chamber, hot chamber and cool chamber,
said passage means including regenerator means,
and means to heat gas in the hot chamber to initiate cycling of the piston and displacer and thereby produce refrigeration at the cold cylinder and work output in the crankshaft,
the swept volumes of movement of the surfaces on the piston and displacer in said crankcase volume being substantially equal.

14. In a cycling gas cryogenic engine adapted to concurrently deliver mechanical work output and refrigeration output according to claim 13,
wherein the surface on said displacer is provided by a boss on the displacer in said cool chamber,
said boss extending through a wall of said hot cylinder and into the crankcase volume.

15. In a cycling gas cryogenic engine adapted to concurrently deliver mechanical work output and refrigeration output according to claim 14,
wherein the surface on said piston is formed on a side thereof remote from said cold chamber,
said surface facing said crankcase volume.

16. In a cycling gas cryogenic engine adapted to concurrently deliver mechanical work output and refrigeration output according to claim 15,
wherein said surface on said piston is provided by a radially enlarged segment of the piston at the aspect thereof immediately adjacent the crankcase volume,
said enlarged segment defining with the second cylinder an expansion chamber,
and communication means between the expansion chamber and the passage means whereby increased work output at the crankshaft is obtained as a result of gas expansion in the expansion chamber.

17. A cycling gas cryogenic engine adapted to concurrently deliver mechanical work output and refrigeration output according to claim 14,
wherein the surface of said piston is provided by a boss on the piston,
said boss extending through a wall of said cold cylinder and into said crankcase volume.

18. A cycling gas cryogenic engine adapted to concurrently deliver mechanical work output and refrigeration output according to claim 17,
wherein said last-mentioned wall of the cold cylinder defines with the cylinder and said last-mentioned boss an expulsion chamber,
and other communication means between the expulsion chamber and the passage means.

19. In a cryogenic cycling gas engine adapted to concurrently deliver mechanical work output and refrigeration output,
the combination of a housing,
a first cylinder having a reciprocating displacer therein,
said displacer and cylinder defining a hot chamber,
a second cylinder having a reciprocating piston therein,
said piston and second cylinder defining a cold chamber,
a cool chamber defined by said housing,
pipe means interconnecting the hot chamber, the cool chamber and the cold chamber to accommodate gas flow therebetween,
said pipe means including regenerator means through which the flowing gas passes to discharge heat thereto or accept heat therefrom,
said housing defining a crankcase having a crankcase volume with a crankshaft rotatable therein,
rod means connecting the crankshaft and the piston and displacer so that the displacer and piston reciprocate in out-of-phase relation concurrently with the rotation of the crankshaft,
surfaces on the piston and displacer, respectively, which reciprocate within the crankcase volume and with the reciprocation of the piston and displacer,
said surfaces being sized so that the volumes through which they respectively sweep in the crankcase volume in response to said reciprocation are substantially equal, and means to heat the gas in the hot chamber and initiate cyclic reciprocation of the piston and displacer to thereby produce refrigeration at the cold chamber and work output at the crankshaft.

20. A cryogenic engine adapted to concurrently deliver mechanical work output and a refrigeration output according to claim 1, wherein said movable member is disposed in a volume defined by said housing, said displacer and piston elements having surfaces thereon movable in said volume in respons to cycling of said elements, the swept volumes through which said last-mentioned surfaces move in response to said cycling being approximately equal.

References Cited
UNITED STATES PATENTS

| | | | |
|---|---|---|---|
| 2,484,392 | 10/1949 | Van Neeckeren | 62—6 |
| 2,657,552 | 11/1953 | Jonkers | 62—6 |
| 2,657,553 | 11/1953 | Jonkers | 62—6 |
| 3,183,662 | 5/1965 | Korsgren | 62—6 |
| 3,318,100 | 5/1967 | Reinhoudt | 62—6 |

WILLIAM J. WYE, *Primary Examiner.*